July 17, 1951     M. D. FERGUSON     2,561,188

WINDSHIELD PROTECTOR

Filed May 1, 1948

INVENTOR
MARVIN D. FERGUSON

BY *Caswell & Lagaard*

ATTORNEYS

Patented July 17, 1951

2,561,188

UNITED STATES PATENT OFFICE 2,561,188

WINDSHIELD PROTECTOR

Marvin D. Ferguson, Minneapolis, Minn.

Application May 1, 1948, Serial No. 24,462

2 Claims. (Cl. 160—23)

My invention relates to improvements in protectors for windshields of vehicles, particularly, though not exclusively, automobiles, an object of the invention being to supply a simple, durable and relatively inexpensive device of the instant nature adapted to be quickly and easily attached to a vehicle and readily adjusted to cover the windshield, when the vehicle is parked outside, thereby to protect the windshield against the accumulation of frost, sleet, snow or the like, which otherwise would obscure the driver's vision upon putting the vehicle into use.

A further object of the invention is to provide a device, as above, which is readily adjusted to uncover the windshield and which, when so adjusted, is attractive in appearance in its place upon the vehicle, and free from any annoying sound-producing vibrations.

Another object of the invention is to provide a device of the instant nature adapted to be applied to a vehicle and employed without mutilating the vehicle in any respect.

An additional object of the invention is to supply a protector of the instant nature which is adapted to be readily constructed largely of stock materials and at minimum cost in the fabrication and assembly of parts.

Other objects of the invention reside in the novel combination and arrangement of parts and in the details of construction hereinafter illustrated and/or described.

Figure 1:
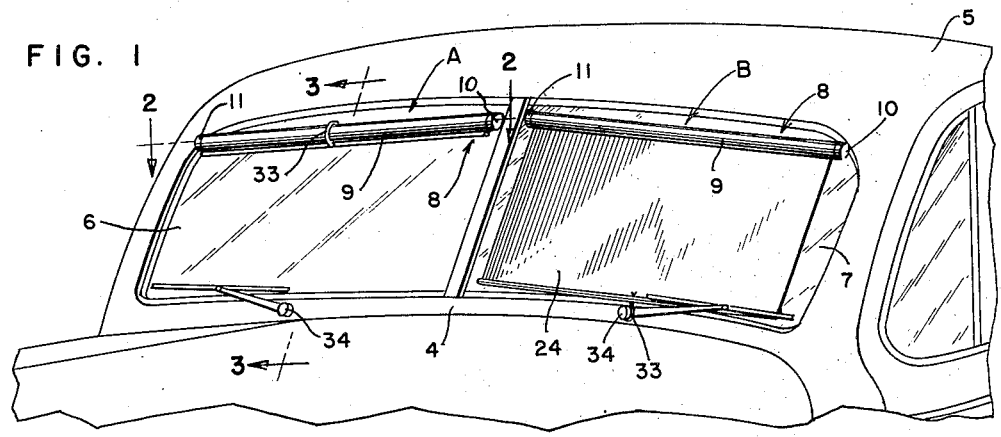
Figure 2:
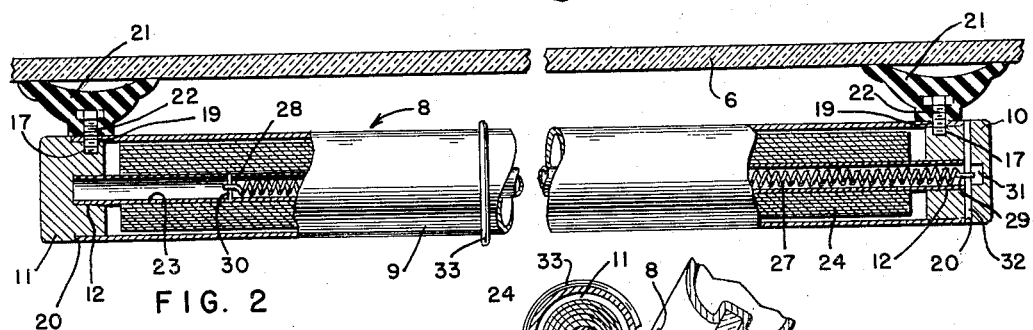
Figure 3:
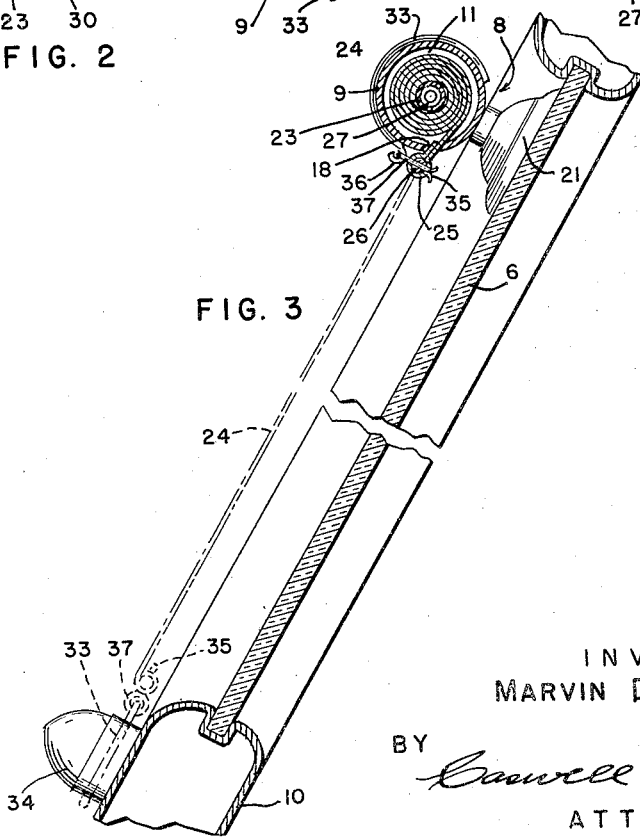

In the drawing, Fig. 1 is a perspective view fragmentarily showing the front portion of an automobile equipped with a pair of protectors constructed in embodiment of my present invention, the one protector on one of the windshield sections being shown adjusted, as in disuse, and the other protector being shown adjusted, as in use; Fig. 2 is a fragmentary detail view of one of the devices shown in Fig. 1, said view being partly in plan, and partly in section, as on the line 2—2 of Fig. 1; Fig. 3 is a fragmentary sectional view in detail taken as on the line 3—3 of Fig. 1.

Reference being had to the drawing, it will be seen that the two illustrated protectors A, B are applied to the windshield 4 of an automobile 5, the one protector A being mounted on the glass panel 6 of said windshield 4, the other protector B being mounted on the glass panel 7 of said windshield. Said two protectors being identical, detailed attention will be directed chiefly to the protector A, which it will be noted includes a cylindrical casing 8 consisting of a tubular body 9 closed at its extremities with plugs 10, 11 slip-fitted thereinto. Each of said plugs is formed at its inner end with an axial bore 12 and is also formed with a radial threaded bore 17. Cut in the lower portion of the tubular body 9 lengthwise between the ends thereof is a narrow slot 18 and near each end of the body 9 at the rear thereof, said body is formed with an aperture 19 with which the radial bore 17 of its respective plug 10 or 11 may be registered by bringing the plug axially home with its shoulder 20 against an end of the body 9 and by properly adjusting the plug angularly relative to said body.

To support the protector A upon the glass panel of the windshield 4 and to hold the end plugs 10, 11 in place within the tubular body 9, I employ a pair of rubber suction cups 21 each having a threaded stem 22 projecting therefrom axially thereof. The stem 22 of one such cup 20 is inserted through one aperture 19 in the body 9 and screwed into the bore 17 of the plug 10, the stem 22 of the second suction cup 21 being inserted through the other aperture 19 in said body 9 and screwed into the bore 17 of the plug 11. From the foregoing, it will be readily comprehended that said stems 22 act to hold the plugs 10, 11 against axial and angular movements relative to the tubular body 9 and that with said cups 21 pressed against the upper portion of the glass panel 6 of the windshield 4, the casing 8 will be noiselessly and firmly mounted thereon.

Journaled at its ends in the axial bores 12 of the plugs 10, 11 is a tubular roller 23. A curtain 24, threaded through the slot 18 in the tubular body 9, is attached at its inner end to the roller 23 by an adhesive or other suitable means, the outer end of said curtain 24 being formed with a pleat 25 into which a stiffening rod or rail 26 is inserted. The thickness of the rod 26 is greater than the width of said slot 18 so that said rod 26 forms a stop for engagement with the tubular body 9 to limit the winding of the curtain 24 upon the roller 23.

To cause the roller 23 yieldingly to turn in a direction to wind the curtain 24 thereon, I provide a helical spring 27, the same being disposed within the tubular roller 23 and formed at its ends with loops 28, 29. A pin 30 in the roller 23, arranged diametrically thereof, extends through the loop 28 of said spring 27. The opposite loop 29 of the spring 27 is accommodated in a reduced extension 31 of the axial bore 12 in the plug 10 and is caught about a pin 32 which extends through said plug 10 diametrically thereof. Before the plug 10 is secured relative to the tubular body 9 by means of the stem 22 of its respective suction cup 21, said plug 10 is turned to tension the spring 27 and wind in the curtain 24 upon the roller 23 bringing the rod 26 on said curtain into contact with said tubular body 9. Thus tensioned, the spring 27 will noiselessly hold the curtain 24 wound in upon the roller 23, but will yield sufficiently to permit said curtain to be drawn from the roller 23 downwardly across the face of the windshield into a protective position such as that shown in broken lines in Fig. 3, and in solid lines in Fig. 1 in the illustrated operative adjustment of the protector.

In order releasably to maintain the curtain 24 in extended protective position against the action of the spring 27, a hook 33 is provided at the free end of said curtain, said hook being adapted to be caught about a portion of the windshield wiper 34 or other projecting part of the vehicle. This hook 33 is fastened to the curtain 24 through the medium of a swivelling staple 35 extending through the hem 25 of said curtain and the stiffening rod 26 therein, said hook 33 having a loop 36 in the shank thereof which is caught in an eye 37 at the head of said staple 35. The hook 33 is constructed of resilient wire and is curved in substantial conformity with the circumference of the tubular body 9 so that when the curtain 24 is rolled up into position of disuse, said hook 33 may be sprung into position about the body 9 wherein it will releasably grip said body and thereby be firmly held thereon without tendency to rattle against the same.

It will now have become apparent that my improved windshield protector lends itself to economical fabrication largely from stock materials; that the parts are quickly and easily assembled; that the device is quickly and easily mounted for use and dismounted without mutilating the vehicle to which it is applied; that the parts of the device per se and the means for attaching the same to a vehicle are rattle-free, and that the protective curtain 24 is quickly and easily drawn and held in extended position of use or payed back into the casing 8 in concealed position of disuse.

Changes in the specific form of my invention, as herein described, may be made within the scope of what is claimed without departing from the spirit of my invention.

Having described my invention, what I claim as new and desire to protect by Letters Patent is:

1. In a device of the character described, a cylindrical casing consisting of a tubular body and a pair of plugs, one plug for each end of said body, each plug being adapted to close its respective end of said body and being formed at its inner portion with an axial bore and with a radial bore, said tubular body having a slot therein longitudinally thereof between its ends and formed near each end with an aperture for registry with the radial bore of its respective plug, a tubular roller journaled at its ends in the axial bores in said plugs, a curtain extending through the slot in said body and fastened at its inner end to said roller, a helical spring within the roller having one end thereof fastened to said roller, means carried by one of said plugs for fastening the other end of said spring thereto, such plug being rotatable in the tubular body to tension said spring, supporting members, one for each end of the casing, each supporting member having a stem removably applicable to the casing to extend through its respective aperture in said body and into the radial bore of its respective plug, said stems serving normally to secure their respective plugs relative to said tubular body.

2. In a device of the character described, a cylindrical casing having a tubular body, a plug adapted to close one end of the tubular body and formed at its inner portion with an axial bore and a radial bore, said tubular body having a slot therein longitudinally thereof and formed with an aperture for registry with the radial bore in said plug, a tubular roller within the casing, said roller being journaled at one end thereof in the axial bore in said plug, a curtain extending through the slot in said body and fastened at its inner end to said roller, a helical spring within the roller having one end thereof fastened to said roller, means carried by said plug for fastening the other end of said spring thereto, said plug being rotatable in the tubular body to tension said spring, supporting means for the casing including a stem removably applicable to the casing to extend through said aperture in said body and into the radial bore of said plug, said stem normally depriving said plug of rotational movement relative to said tubular body.

MARVIN D. FERGUSON.

REFERENCES CITED

The following references are of record in the file of this patent:

UNITED STATES PATENTS

| Number | Name | Date |
|---|---|---|
| 457,639 | Doenitz | Aug. 11, 1891 |
| 1,621,972 | Darby | Mar. 22, 1927 |
| 1,901,073 | Bailey | Mar. 14, 1933 |